United States Patent
Zhang et al.

(10) Patent No.: US 10,873,968 B2
(45) Date of Patent: Dec. 22, 2020

(54) METHOD, APPARATUS AND COMPUTER PROGRAM PRODUCT FOR TRANSMISSION

(71) Applicant: Nokia Technologies Oy, Espoo (FI)

(72) Inventors: Yuantao Zhang, Beijing (CN); Yan-Ji Zhang, Beijing (CN); Yi Zhang, Beijing (CN)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/346,969

(22) PCT Filed: Nov. 14, 2016

(86) PCT No.: PCT/CN2016/105665
§ 371 (c)(1),
(2) Date: May 2, 2019

(87) PCT Pub. No.: WO2018/086107
PCT Pub. Date: May 17, 2018

(65) Prior Publication Data
US 2020/0068606 A1    Feb. 27, 2020

(51) Int. Cl.
*H04W 72/12* (2009.01)
*H04L 29/08* (2006.01)
(Continued)

(52) U.S. Cl.
CPC ....... *H04W 72/1289* (2013.01); *H04L 69/324* (2013.01); *H04W 72/0466* (2013.01); *H04W 76/27* (2018.02); *H04W 88/02* (2013.01)

(58) Field of Classification Search
CPC .......... H04W 72/1289; H04W 72/0466; H04L 69/324
See application file for complete search history.

(56) References Cited

U.S. PATENT DOCUMENTS

2011/0194514 A1* 8/2011 Lee, II ............... H04L 5/0057
370/329
2013/0028242 A1* 1/2013 Baker ............... H04L 5/0055
370/336
(Continued)

FOREIGN PATENT DOCUMENTS

| CN | 102340885 A | 2/2012 |
| WO | 2012/069001 A1 | 5/2012 |
| WO | 2014/090200 A1 | 6/2014 |

OTHER PUBLICATIONS

International Search Report and Written Opinion received for corresponding Patent Cooperation Treaty Application No. PCT/CN2016/105665, dated Aug. 9, 2017, 11 pages.
(Continued)

*Primary Examiner* — Jamal Javaid
(74) *Attorney, Agent, or Firm* — Harrington & Smith

(57) ABSTRACT

Method, apparatus and computer program product are disclosed for transmission in a wireless network. A method comprises: transmitting an uplink data block using grant free; detecting a downlink channel after a predefined timing or in a predefined time window; and determining whether the downlink channel being for a user equipment, wherein the uplink data block comprises information for identifying the user equipment identity, and a part of the user equipment identity is used to scramble a predefined part of the user equipment specific downlink channel.

18 Claims, 7 Drawing Sheets

(51) Int. Cl.
  *H04W 72/04* (2009.01)
  *H04W 76/27* (2018.01)
  *H04W 88/02* (2009.01)

(56) References Cited

U.S. PATENT DOCUMENTS

2014/0192767 A1    7/2014  Au et al.
2017/0288817 A1*  10/2017  Cao ....................... H04L 1/1812

OTHER PUBLICATIONS

Extended European Search Report received for corresponding European Patent Application No. 16921371.7, dated May 13, 2020, 8 pages.
"Basic Grant-Free Transmission Procedure for URLLC", 3GPP TSG-RAN WG1 #87, R1-1612250, Agenda: 7.1.4.4, Nokia, Nov. 14-18, 2016, 4 pages.

* cited by examiner

METHOD, APPARATUS AND COMPUTER PROGRAM PRODUCT FOR TRANSMISSION

RELATED APPLICATION

This application was originally filed as PCT Application No. PCT/CN2016/105665, filed on 14 Nov. 2016.

FIELD OF THE INVENTION

Embodiments of the disclosure generally relate to wireless communications, and, more particularly, to method, apparatus and computer program product for transmission in a wireless network.

BACKGROUND

In the wireless network such as a cellular network, generally a user equipment (UE) is required to trigger radio resource control (RRC) connection establishment procedure if the UE desires to send data, such as starting an application to browse the internet or sending an email, or the UE moves into a new tracking area and has to complete the tracking area update signalling procedure, or the like. In general, such technology may be referred to as scheduled grant uplink (UL) multiple access.

However, the scheduled grant uplink (UL) multiple access may lead to signalling overhead, transmission latency, and power consumption and not suitable for some applications, for example small packet transmission such as massive machine type communication (mMTC), voice over Internet protocol (VoIP), gaming, TCP ACK, and ultra-reliable low-latency communications (URLLC) with real-time remote control, etc. Therefore, it is desirable to provide an improved solution for transmission.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to first aspect of the disclosure, it is provided a method for transmission in a wireless network. The method comprises: transmitting an uplink data block using grant free; detecting a downlink channel after a predefined timing or in a predefined time window; and determining whether the downlink channel being for a user equipment, wherein the uplink data block comprises information for identifying the user equipment identity, and a part of the user equipment identity is used to scramble a predefined part of the user equipment specific downlink channel.

According to second aspect of the disclosure, it is provided an apparatus for transmission in a wireless network. The apparatus comprises: at least one processor; and at least one memory including computer program code, wherein the at least one memory and the computer program code are configured to, with the at least one processor, cause the apparatus to transmit an uplink data block using grant free; detect a downlink channel after a predefined timing or in a predefined time window; and determine whether the downlink channel being for a user equipment, wherein the uplink data block comprises information for identifying the user equipment identity, and a part of the user equipment identity is used to scramble a predefined part of the user equipment specific downlink channel.

According to third aspect of the disclosure, it is provided an apparatus for transmission in a wireless network. The apparatus comprises: means for transmitting an uplink data block using grant free; means for detecting a downlink channel after a predefined timing or in a predefined time window; and means for determining whether the downlink channel being for a user equipment, wherein the uplink data block comprises information for identifying the user equipment identity, and a part of the user equipment identity is used to scramble a predefined part of the user equipment specific downlink channel.

According to fourth aspect of the present disclosure, it is provided a computer program product comprising at least one non-transitory computer-readable storage medium having computer-executable program instructions stored therein, the computer-executable instructions being configured to, when being executed, cause an apparatus to transmit an uplink data block using grant free; detect a downlink channel after a predefined timing or in a predefined time window; and determine whether the downlink channel being for a user equipment, wherein the uplink data block comprises information for identifying the user equipment identity, and a part of the user equipment identity is used to scramble a predefined part of the user equipment specific downlink channel.

According to fifth aspect of the disclosure, it is provided a method for transmission in a wireless network. The method comprises: receiving an uplink data block transmitted by a user equipment using grant free, wherein the uplink data block comprises information for identifying the user equipment identity; recognizing the user equipment based on the information; and transmitting a downlink channel to the user equipment after a predefined timing or in a predefined time window, wherein a part of the user equipment identity is used to scramble a predefined part of the user equipment specific downlink channel.

According to sixth aspect of the disclosure, it is provided an apparatus for transmission in a wireless network. The apparatus comprises: at least one processor; and at least one memory including computer program code, wherein the at least one memory and the computer program code are configured to, with the at least one processor, cause the apparatus to receive an uplink data block transmitted by a user equipment using grant free, wherein the uplink data block comprises information for identifying the user equipment identity; recognize the user equipment based on the information; and transmit a downlink channel to the user equipment after a predefined timing or in a predefined time window, wherein a part of the user equipment identity is used to scramble a predefined part of the user equipment specific downlink channel.

According to seventh aspect of the disclosure, it is provided an apparatus for transmission in a wireless network. The apparatus comprises: means for receiving an uplink data block transmitted by a user equipment using grant free, wherein the uplink data block comprises information for identifying the user equipment identity; means for recognizing the user equipment based on the information; and means for transmitting a downlink channel to the user equipment after a predefined timing or in a predefined time window, wherein a part of the user equipment identity is used to scramble a predefined part of the user equipment specific downlink channel.

According to eighth aspect of the present disclosure, it is provided a computer program product comprising at least one non-transitory computer-readable storage medium having computer-executable program instructions stored therein, the computer-executable instructions being configured to, when being executed, cause an apparatus to receive an uplink data block transmitted by a user equipment using grant free, wherein the uplink data block comprises information for identifying the user equipment identity; recognize the user equipment based on the information; and transmit a downlink channel to the user equipment after a predefined timing or in a predefined time window, wherein a part of the user equipment identity is used to scramble a predefined part of the user equipment specific downlink channel.

These and other objects, features and advantages of the disclosure will become apparent from the following detailed description of illustrative embodiments, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Embodiments of the disclosure propose grant-free transmission solution for various use cases and for various UE states, not only for RRC connected state, but also for new RRC inactive or RRC idle when data transmission with connectionless RAN-Core interface is enabled. For such UE, the UE's location is known to network within an area and UE performs mobility within that area without notifying the network, wherein the area may cover two or more radio/serving cells. In the RRC inactive state or RRC idle when connectionless data transmission is enabled, a UE may be allocated with a longer UE identity (ID) (e.g. 40 bits). This longer UE ID may be used to fetch UE context from radio access network (RAN) or from core network, depending on the detailed design of UE state. Embodiments of the disclosure propose to split the longer UE ID (e.g. 40 bits) into two parts and handle these parts differently. When a specific UE transmits a UL data using grant-free, it needs to listen to downlink (DL) control channel to get response from network element such as base station, for example, detection result or scheduling information. However with the longer allocated UE ID (compared with 16 bits C-RNTI (cell radio network temporary identifier)), the traditional way of identifying a DL control channel using cyclic redundancy check (CRC)(for example, 16 bits) scrambling sequence is not feasible any more. Therefore, it is desirable to solve how such a UE can identify UE specific DL control channel after the UE has transmitted a UL data block using grant-free and achieve low detection effort and low overhead.

Figure 1:
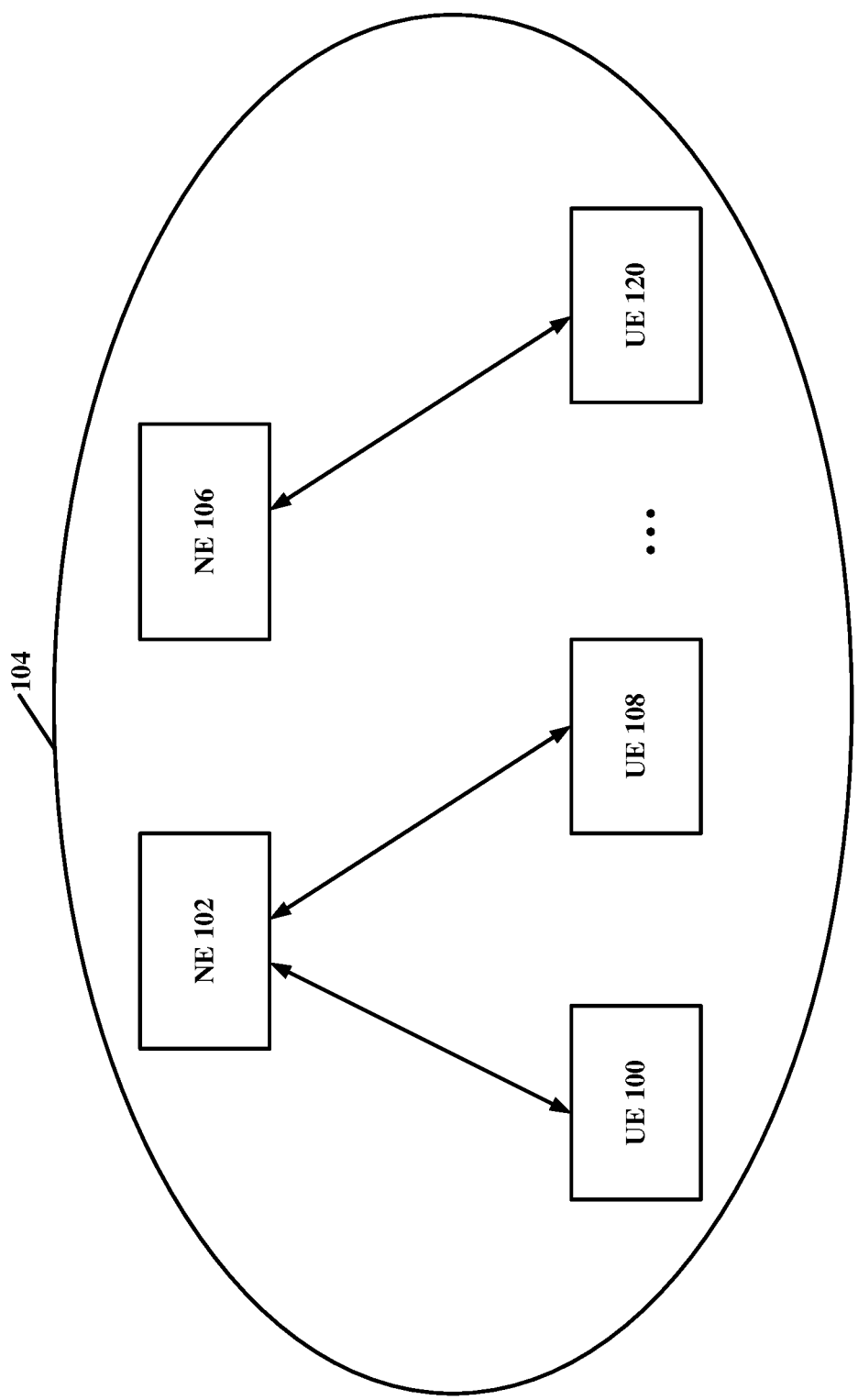
FIG. 1 schematically shows a wireless system according to an embodiment of the disclosure.

FIG. 1 schematically shows a wireless system according to an embodiment of the disclosure. While this and other embodiments below are primarily discussed in the context of a LTE system, it will be recognized by those of ordinary skill that the disclosure is not so limited. In fact, the various aspects of this disclosure are useful in any wireless network that can benefit from the grant-free transmission solution as described herein, such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma1000, etc. UTRA includes Wideband CDMA (WCDMA) and other variants of CDMA. CDMA1000 covers IS-1000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, etc.

As shown in FIG. 1, the wireless system may comprise one or more network elements (NEs) 102 and 106 such as an eNB and a plurality of UEs 100, 108 and 120 such as LTE machine type communication (MTC) UEs and smart phone. The network element refers to function elements on the network side as compared to the UEs. For example, the network element 102 may be an eNB. The solid lines with double arrows indicate desired transmissions between the UEs and the network element on the downlink and uplink. It is well known that a cellular radio system may comprise a network of radio cells each served by a transmitting station, known as a cell site or base transceiver station. The radio network provides wireless communications service for a plurality of transceivers (mobile or fixed). The network of network elements working in collaboration allows for wireless service which is longer than the radio coverage provided by a single network element. The individual network element is connected by another network (in many cases a wired network, not shown), which includes additional controllers for resource management and in some cases access to other network systems (such as the Internet) or metropolitan area networks (MANs).

The UE 100 may be allocated a longer UE ID (e.g. 40 bits) compared with the UE identifier (such as 16 bits C-RNTI) used to identify itself in a radio/serving cell. For example, the longer UE identity (ID) may comprise a first part used to identify the user equipment (such as the C-RNTI) and a second part used to identify a network element serving the UE. In another example, the longer UE ID may be constructed in any other suitable forms. It is noted that the UE ID used herein refers to the longer UE ID unless specified otherwise in the description.

In addition, the longer UE ID may be associated with an area as shown by 104 in FIG. 1 which may cover two or more radio/serving cells. For example, the UE's location may be known to network within the area 104 and the UE may perform mobility within that area 104 without notifying the network. Moreover the network element 102 may store or obtain the association information between the longer UE ID and the area 104. In addition the longer UE ID or a part of the longer UE ID may uniquely identify the UE within the area.

In addition, the longer UE ID may be assigned by CN (core network) which is associated with a specific PDU session. The long UE ID may consist of an identifier of a CN network entity and an identifier for a specific session for this UE.

As used herein, the terms "user equipment" may include, but not limited to, cellular telephones, smart phones, and computers, whether desktop, laptop, or otherwise, as well as mobile devices or terminals such as LTE MTC UEs, MTC devices, handheld computers, PDAs, video cameras, set-top boxes, personal media devices, sensors, meters, or any combinations of the foregoing. Further, the term "wireless" means any wireless signal, data, communication, or other interface including without limitation 5G, 4G (e.g., LTE, LTE-A), Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

As used herein, the terms "network element" may include, but not limited to, a base station such as e.g. an eNB, a Home eNode B, femto Base Station, pico BS or any other element capable to serve user equipment in the wireless system.

Figure 2:
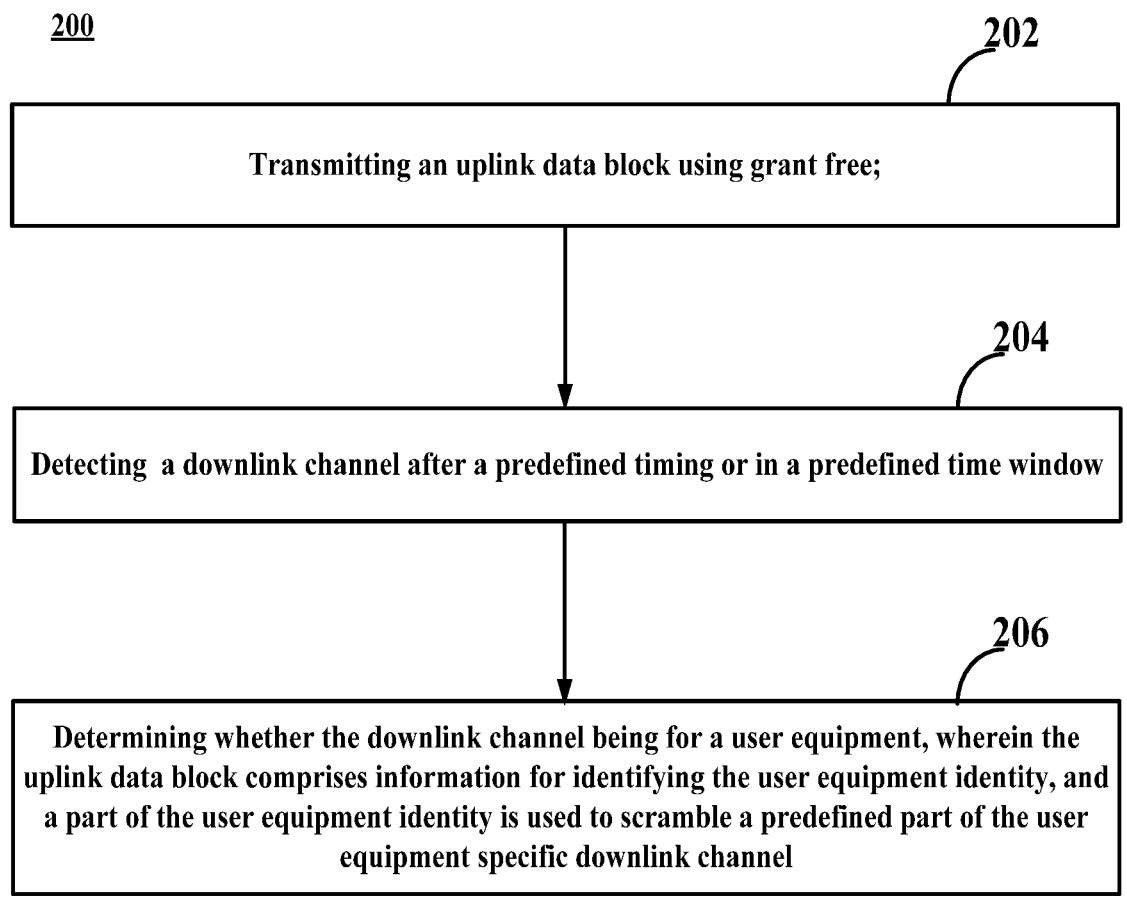
FIG. 2 is a flow diagram depicting a method of transmission according to an embodiment of the disclosure.

FIG. 2 is a flow diagram depicting a method of transmission according to an embodiment of the disclosure. The method 200 can be implemented in UE 100 as shown in FIG. 1.

As shown in FIG. 2, the method 200 includes step 202, where UE 100 may transmit an uplink data block using grant free, wherein the uplink data block comprises information for identifying the user equipment identity (UE ID). In this case, UE 100 may not in RRC connected state if UE 100 uses grant free transmission. The information for identifying the user equipment identity (UE ID) can be any suitable information. For example, the information may be full UE ID. In another example, if partial bits of UE ID can uniquely identify UE 100, then the information may be the partial bits of UE ID. In still another example, the partial bits of UE ID or full UE ID may be used to scramble a specified part of the uplink data block such that the NE 102 can identify UE from the specified part based on the scrambling sequence.

As mentioned above, the UE ID refers to the longer UE ID (e.g. 40 bits) compared with the UE identifier (such as 16 bit C-RNTI) used to identify itself in a serving cell. The UE ID may be allocated by the network when UE 100 establishes the connection or turns to RRC inactive state or disconnects with the network or in case of a request by UE 100 or in any other suitable ways for example.

The grant free may mean that UE 100 can transmit an uplink data block on a uplink data channel without scheduling. The network element 102 may not allocate dedicate resources for UE 100. Instead, the network element 102 may pre-allocate some resources to UE 100 which may be shared with other UEs such as UE 108. In this case, UE 100 may transmit the uplink data block on the pre-allocated resources using grant free. In addition, UE 100 can transmit UL data block with existing or future or private message.

After transmitting the uplink data block using grant free, UE 100 may detect a downlink channel such as physical downlink control channel (PDCCH) after a predefined timing or in a predefined time window at step 204. For example, when the network element 102 receives the uplink data block, it may recognize UE 100 based on the information comprised in the uplink data block, and then transmit the downlink channel after the predefined timing or in a predefined time window. The downlink channel may be any suitable downlink channel such as existing or future defined downlink control channel or downlink data channel or private downlink control/data channel.

The predefined timing or the predefined time window may be defined in existing or future communication standards such as the 3rd generation partnership project (3GPP) standards, or may be private, depending on the detailed design of wireless network. In addition, the predefined timing or the predefined time window may be fixed or variable. The DL channel can be a response of the UL data block detection result, or be used to schedule a DL data channel carrying e.g., TCP ACK, or used for any other suitable purpose.

In an embodiment, since there are not specific resources for UE 100 at this stage, in order for UE 100 to identify whether the downlink channel is for itself, the network element 102 may scramble a predefined part of UE 100 specific downlink channel by using a part of UE 100's ID (such as the longer UE ID) as scrambling sequence. The part of the UE ID may be any suitable part of the UE ID depending on specific implementation for example. In an embodiment, the part of the UE ID may be the least significant bits (LSB) or the most significant bits (MSB) of the UE ID. In other embodiments, the part of the UE ID may be the middle part of the UE ID. It is noted that the part of the UE ID may be known by both the UE 100 and the network element 102.

The predefined part of UE 100 specific downlink channel may be any suitable part of the UE 100 specific downlink channel. In an embodiment, the predefined part is the cyclic redundancy check (CRC) of the downlink channel. The length of the user equipment identity is longer than the length of the cyclic redundancy check, and the length of the part of the user equipment identity may be equal to the length of the predefined part of the user equipment specific downlink channel. In an embodiment, the downlink channel may be a downlink control channel, or a downlink data channel.

In an embodiment, the user equipment identity may comprise a first part used to identify the user equipment and a second part used to identify a network element serving the user equipment, and the first part is used to scramble a predefined part of the user equipment specific downlink channel.

Figure 3:
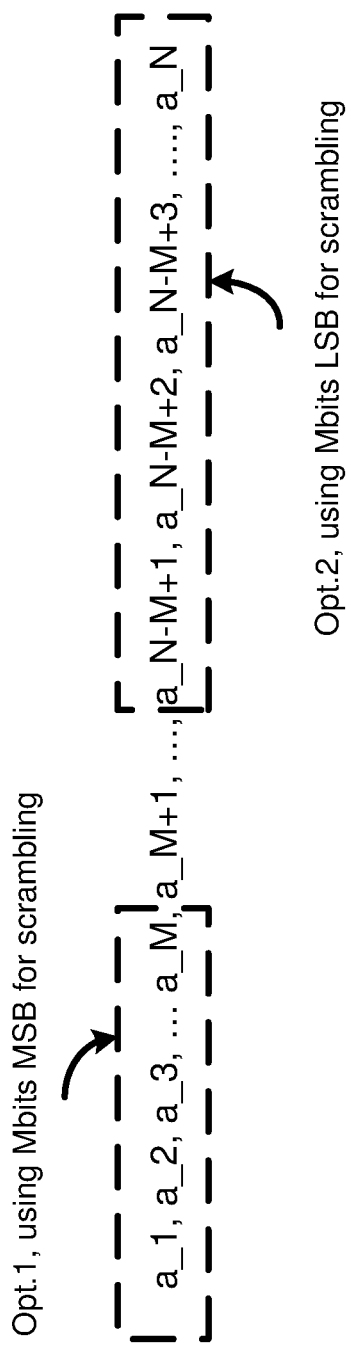
FIG. 3 schematically shows an example of UE identity according to an embodiment of the disclosure.

FIG. 3 shows an example of UE ID according to an embodiment of the disclosure. As shown in FIG. 3, the UE-ID has N bits, a_1 to a_N. The scrambling sequences for CRC of the downlink control channel such as PDCCH can be M bits MSB from a_1 to a_M, or M bits LSB from a_N-M+1 to a_N. Where N denotes the length of the UE ID and M is the length of scrambling sequence. In an embodiment, if the UE ID contains the UE identifier such as C-RNTI first, then the M bits MSB may be considered as the scrambling sequence for CRC, otherwise, the M bits LSB may be used as the scrambling sequence for CRC.

Turn to FIG. 2, after UE 100 has detected the downlink channel, it may determine whether the downlink channel is for itself at step 206. In an embodiment, the downlink channel is a downlink control channel, and UE 100 may compare the part of the user equipment identity used to scramble a predefined part of the user equipment specific downlink channel with the corresponding scrambling sequence used for the predefined part (such as CRC) of the downlink control channel (such as PDCCH), as shown by step 206-1 in FIG. 4. For example, UE 100 may decode the PDCCH and get the PDCCH bits, then calculate the CRC of the PDCCH bits and scramble the calculated CRC with the part of the user equipment identity, finally compare the scrambled CRC by UE 100 with the CRC in the PDCCH.

Figure 4:
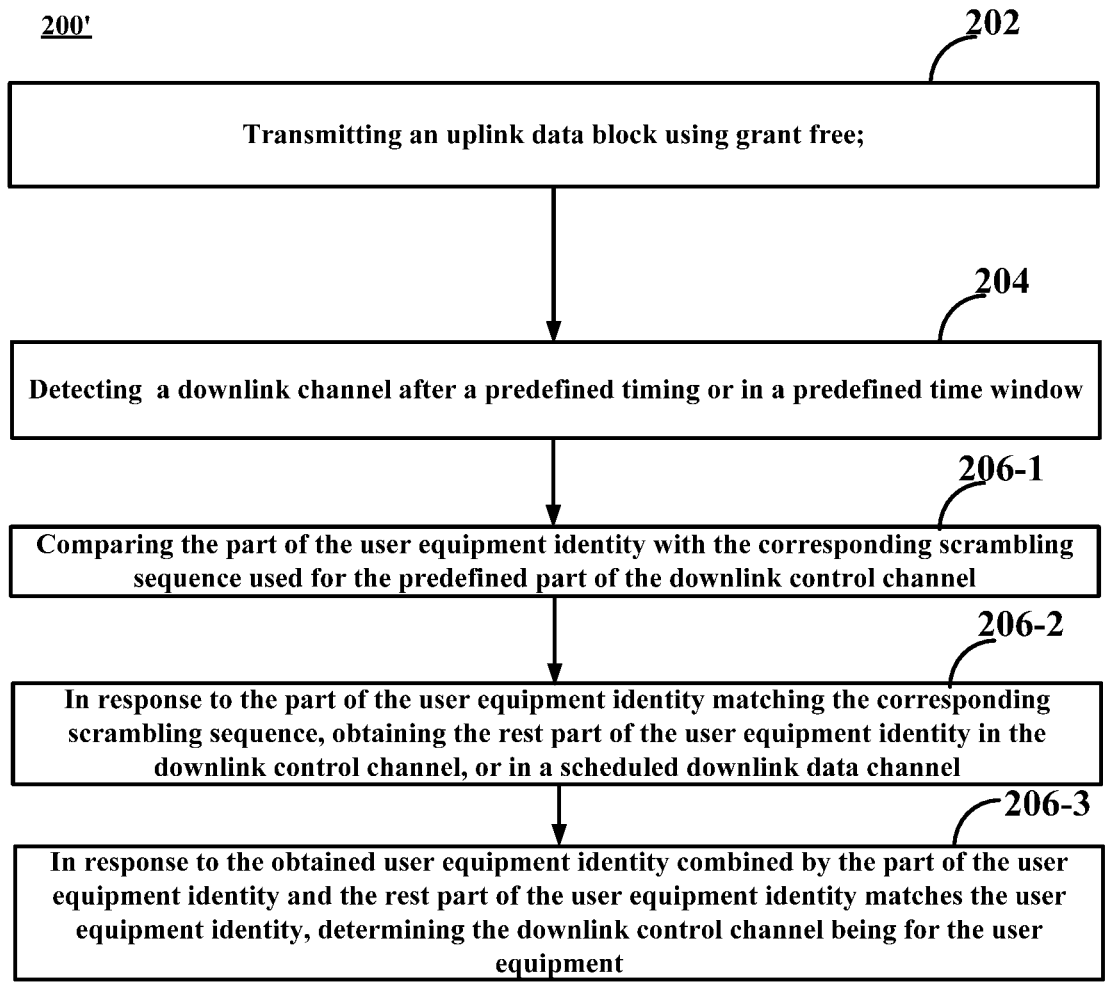
FIG. 4 is a flow diagram depicting a method of transmission according to an embodiment of the disclosure.

In this embodiment, in response to the part of the user equipment identity matching the corresponding scrambling sequence, UE 100 may obtain the rest part of the user equipment identity in the downlink control channel, or in a scheduled downlink data channel, as shown by step 206-2 in FIG. 4. In an embodiment, the downlink control channel may comprise an indicator indicating the function of the downlink control channel. The indicator may contain at least one bit. For example, the downlink control channel may be for detection response or for scheduling a downlink message or for any other suitable functions. In an embodiment, the indicator may contain one bit, and the downlink control channel is for detection response or for scheduling a downlink data channel.

Then UE 100 may obtain the rest part of the UE ID based on the indicator. For example, the rest part of the UE ID may be transmitted as downlink control channel (such as PDCCH) payload if the downlink control channel is for detection response. UE 100 may obtain a full UE ID by combining the part of the user equipment identity and the rest part of the user equipment identity obtained from the downlink control channel payload. As another example, if the downlink control channel is used to schedule a downlink data channel, the rest part of the UE ID may be transmitted in the scheduled message such as physical downlink shared channel (PDSCH). In this case, UE 100 may obtain a full UE-ID by combining the part of the user equipment identity and the rest part of the user equipment identity obtained from the scheduled message such as PDSCH.

In response to the obtained UE ID combined by the part of the user equipment identity and the rest part of the user equipment identity matches the UE ID of UE 100, UE 100 may determine the downlink control channel being for UE 100, as shown by step 206-3 in FIG. 4. Otherwise UE 100 may omit the downlink control channel or retransmit the uplink data block or wait some time to detect another downlink control channel, depending on specific implementation.

In another embodiment, the downlink channel may be a downlink data channel. In this case, the rest of the user equipment identity may be obtained from the downlink data channel. For example, the rest of the user equipment identity may be included in the header or payload of the downlink data channel.

In an embodiment, the UE specific downlink channel has fixed size. In this way, it can facilitate the downlink control channel (such as PDCCH) blind detection.

Table 1 and Table 2 give examples on downlink information (DCI) format for two kinds of downlink channel such as PDCCH, wherein one kind of downlink channel is used to indicate detection result and the other one is used to schedule a DL data channel such as PDSCH, and 1-bit indicator is included in each DCI. The total amount of bits of each of the two kinds of downlink channel is B+1.

TABLE 1

DCI format for scheduling a PDSCH

| Item | Value | Note |
| --- | --- | --- |
| Scheduling or response | 0 | Means it is for scheduling |
| Resource allocation | K1 bits | K1 + K2 + K3 + K4 = B bits |

TABLE 1-continued

DCI format for scheduling a PDSCH

| Item | Value | Note |
| --- | --- | --- |
| MCS | K2 bits | |
| Optional item 1 | K3 bits | |
| Optional item 2 | K4 bits | |

TABLE 2

DCI format for response a UL data packet

| Item | Value | Note |
| --- | --- | --- |
| Scheduling or response | 1 | Means it is for scheduling |
| Rest bits of UE-ID | N-M | N-M + L = B bits |
| Optional item | L bits | |

Figure 5:
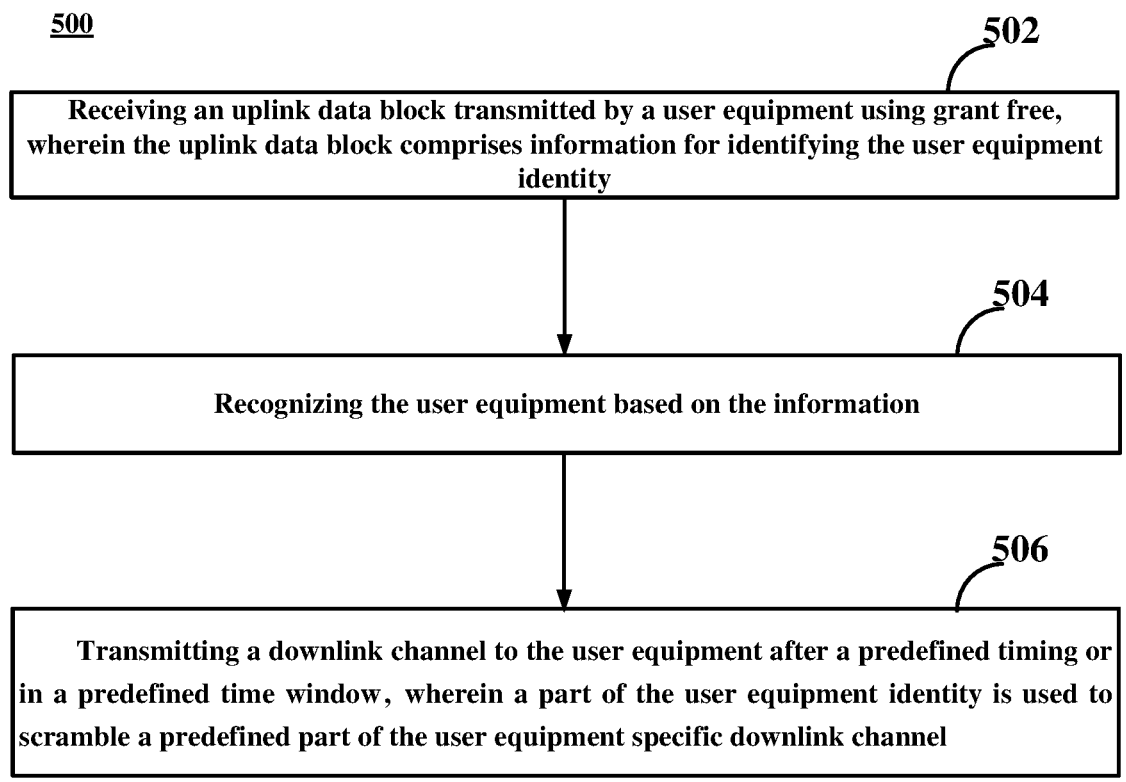
FIG. 5 is a flow diagram depicting a method of transmission according to an embodiment of the disclosure.

FIG. 5 is a flow diagram depicting a method of transmission according to an embodiment of the disclosure. The method 500 can be implemented in network element such as NE 102 in FIG. 1. Since NE and UE are complementary entities and some of their operations are complementary operations, the description of the complementary operations which has been described with reference to FIGS. 2-4 are omitted herein for brevity.

As shown in FIG. 5, the method 500 includes step 502, wherein NE 102 may receive an uplink data block transmitted by for example UE 100 using grant free, wherein the uplink data block comprises information for identifying the UE ID of UE 100.

At step 504, NE 102 may recognize the UE based on the information. For example, as mentioned above, the information may be full UE ID or partial bits of UE ID which can uniquely identify UE 100, and NE 102 can get full UE ID or the partial bits of UE ID and recognize UE 100 based on the full UE ID or the partial bits of UE ID. In another embodiment, if the partial bits of UE ID or full UE ID are used to scramble a specified part of the uplink data block, then the NE 102 can recognize UE 100 from the specified part base on the scrambling sequence.

At step 506, NE 102 may transmit a downlink channel after a predefined timing or in a predefined time window to UE 100, wherein a part of the user equipment identity is used to scramble a predefined part of the user equipment specific downlink channel. The predefined part may be any suitable part of the user equipment specific downlink channel as mentioned above. In an embodiment, the predefined part is the cyclic redundancy check of the downlink channel.

In an embodiment, the length of the user equipment identity is longer than the length of the cyclic redundancy check. For example, if the cyclic redundancy check contains 16 bits, then the user equipment identity may be longer than 16 bits, such as 40 bits.

In an embodiment, the downlink channel is a downlink control channel, or a downlink data channel.

In an embodiment, the part of the user equipment identity is the least significant bits or the most significant bits of the user equipment identity as described with reference to FIG. 3.

In an embodiment, the user equipment identity may comprise a first part used to identify the user equipment and a second part used to identify a network element serving the user equipment, and the first part is used to scramble a predefined part of the user equipment specific downlink channel.

In an embodiment, the downlink channel is a downlink control channel, which comprises an indicator indicating the function of the downlink control channel. The indicator may contain at least one bit. For example, the downlink control channel may be for detection response or for scheduling a downlink message or for any other suitable functions. In an embodiment, the indicator may contain one bit, and the downlink control channel is for detection response or for scheduling a downlink data channel.

In an embodiment, the function of the downlink control channel is for detection response and the downlink control channel contains information of the rest part of the user equipment identity, or the function of the downlink control channel is for scheduling the downlink data channel and the scheduled downlink data channel contains information of the rest part of the user equipment identity.

In an embodiment, the downlink channel is a downlink data channel, which contains information of the rest of the user equipment identity. For example, the rest of the user equipment identity may be contained in the header or payload of the downlink data channel.

In an embodiment, the user equipment specific downlink channel has fixed size as described with reference to Tables 1 and 2.

In an embodiment, the user equipment's location is known to network within an area and the user equipment performs mobility within the area without notifying the network.

Figure 6:
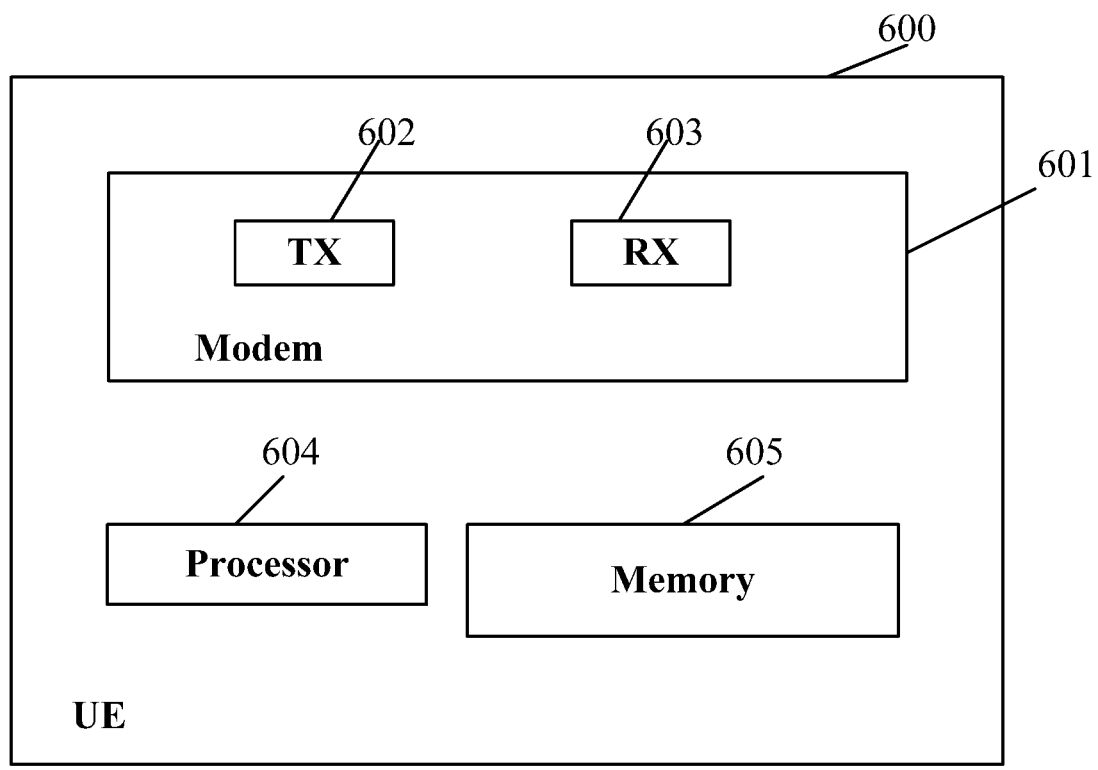
FIG. 6 is a simplified block diagram illustrating a user equipment according to an embodiment of the disclosure.

According to an aspect of the disclosure, it is provided an apparatus such as user equipment for transmission in a wireless network. FIG. 6 depicts the apparatus 600 useful in implementing the method 200 as described above. As shown in FIG. 6, apparatus 600 comprises a processing device 604, a memory 605, and a radio modem subsystem 601 in operative communication with the processor 604. The radio modem subsystem 601 comprises at least one transmitter 602 and at least one receiver 603. While only one processor is illustrated in FIG. 6, the processing device 604 may comprises a plurality of processors or multi-core processor(s). Additionally, the processing device 604 may also comprise cache to facilitate processing operations.

Computer-executable instructions can be loaded in the memory 605 and, when executed by the processing device 604, cause the apparatus 600 to implement the above-described method 200. In particular, the computer-executable instructions can cause the apparatus 600 to transmit an uplink data block using grant free; detect a downlink channel after a predefined timing or in a predefined time window; and determine whether the downlink channel being for a user equipment, wherein the uplink data block comprises information for identifying the user equipment identity, and a part of the user equipment identity is used to scramble a predefined part of the user equipment specific downlink channel.

In an embodiment, the predefined part is the cyclic redundancy check of the downlink channel.

In an embodiment, the downlink channel is a downlink control channel or a downlink data channel.

In an embodiment, the length of the user equipment identity is longer than the length of the cyclic redundancy check.

In an embodiment, the part of the user equipment identity is the least significant bits or the most significant bits of the user equipment identity.

In an embodiment, the user equipment identity comprises a first part used to identify the user equipment and a second part used to identify a network element serving the user equipment, and the first part is used to scramble a predefined part of the user equipment specific downlink channel.

In an embodiment, the downlink channel is a downlink control channel, and the computer-executable instructions can cause the apparatus 600 to compare the part of the user equipment identity with the corresponding scrambling sequence used for the predefined part of the downlink control channel; in response to the part of the user equipment identity matching the corresponding scrambling sequence, obtain the rest part of the user equipment identity in the downlink control channel, or in a scheduled downlink data channel; and in response to the obtained user equipment identity combined by the part of the user equipment identity and the rest part of the user equipment identity matches the user equipment identity, determine the downlink control channel being for the user equipment.

In an embodiment, the downlink control channel comprises an indicator indicating the function of the downlink control channel.

In an embodiment, the indicator contains one bit, and the function of the downlink control channel is for detection response or for scheduling a downlink data channel.

In an embodiment, the function of the downlink control channel is for detection response and the rest part of the user equipment identity is obtained from the downlink control channel, or the function of the downlink control channel is for scheduling the downlink data channel and the rest part of the user equipment identity is obtained from the scheduled downlink data channel.

In an embodiment, the downlink channel is a downlink data channel, and the rest of the user equipment identity is obtained from the downlink data channel.

In an embodiment, the user equipment specific downlink channel has fixed size.

In an embodiment, the user equipment's location is known to network within an area and the user equipment performs mobility within the area without notifying the network.

According to an aspect of the disclosure it is provided an apparatus such as a user equipment for transmission in a wireless network. The apparatus comprises: means for transmitting an uplink data block using grant free; means for detecting a downlink channel after a predefined timing or in a predefined time window; and means for determining whether the downlink channel being for a user equipment, wherein the uplink data block comprises information for identifying the user equipment identity, and a part of the user equipment identity is used to scramble a predefined part of the user equipment specific downlink channel.

In an embodiment, the predefined part is the cyclic redundancy check of the downlink channel.

In an embodiment, the downlink channel is a downlink control channel or a downlink data channel.

In an embodiment, the length of the user equipment identity is longer than the length of the cyclic redundancy check.

In an embodiment, the part of the user equipment identity is the least significant bits or the most significant bits of the user equipment identity.

In an embodiment, the user equipment identity comprises a first part used to identify the user equipment and a second part used to identify a network element serving the user equipment, and the first part is used to scramble a predefined part of the user equipment specific downlink channel.

In an embodiment, the apparatus 600 further comprises means for comparing the part of the user equipment identity with the corresponding scrambling sequence used for the predefined part of the downlink control channel; in response to the part of the user equipment identity matching the corresponding scrambling sequence, means for obtaining the rest part of the user equipment identity in the downlink control channel, or in a scheduled downlink data channel; and in response to the obtained user equipment identity combined by the part of the user equipment identity and the rest part of the user equipment identity matches the user equipment identity, means for determining the downlink control channel being for the user equipment.

In an embodiment, the downlink control channel comprises an indicator indicating the function of the downlink control channel.

In an embodiment, the indicator contains one bit, and the function of the downlink control channel is for detection response or for scheduling a downlink data channel.

In an embodiment, the function of the downlink control channel is for detection response and the rest part of the user equipment identity is obtained from the downlink control channel, or the function of the downlink control channel is for scheduling the downlink data channel and the rest part of the user equipment identity is obtained from the scheduled downlink data channel.

In an embodiment, the downlink channel is a downlink data channel, and the rest of the user equipment identity is obtained from the downlink data channel.

In an embodiment, the user equipment specific downlink channel has fixed size.

In an embodiment, the user equipment's location is known to network within an area and the user equipment performs mobility within the area without notifying the network.

Figure 7:
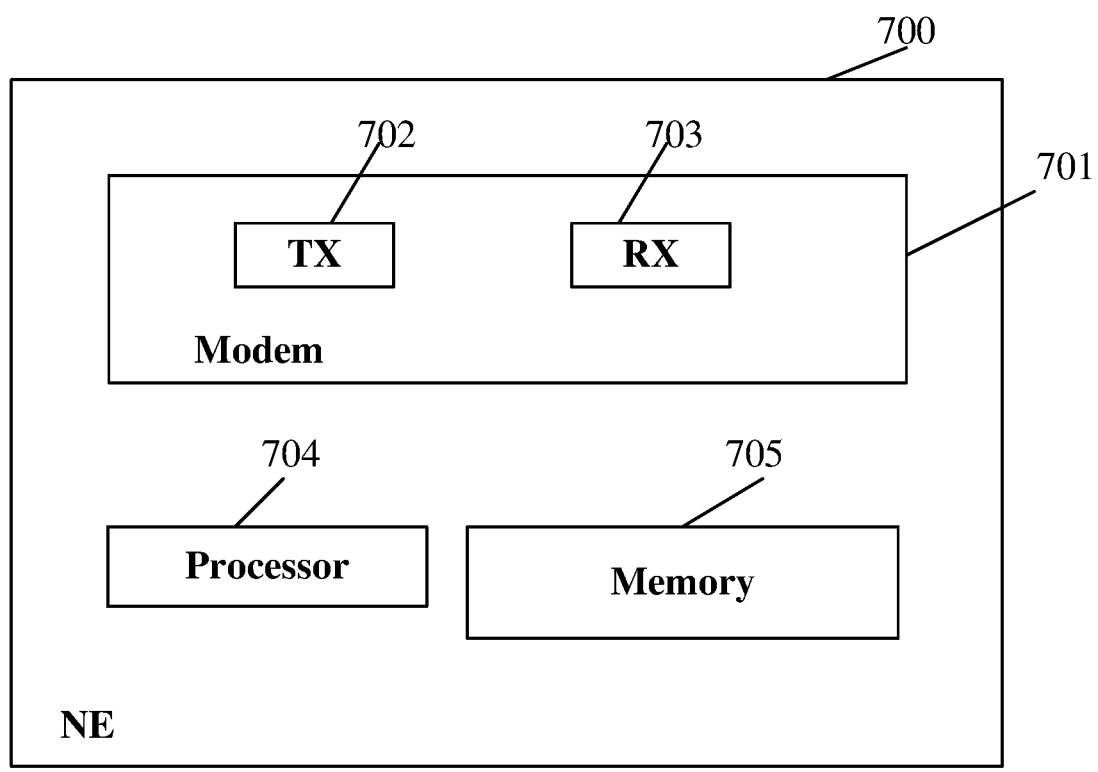
FIG. 7 is a simplified block diagram illustrating a network element according to an embodiment of the disclosure.

According to an aspect of the disclosure it is provided an apparatus 700 such as a network element for transmission in a wireless network. FIG. 7 depicts the apparatus 700 useful in implementing the method 500 as described above. As shown in FIG. 7, the apparatus 700 comprises a processing device 704, a memory 705, and a radio modem subsystem 701 in operative communication with the processor 704. The radio modem subsystem 701 comprises at least one transmitter 702 and at least one receiver 703. While only one processor is illustrated in FIG. 7, the processing device 704 may comprises a plurality of processors or multi-core processor(s). Additionally, the processing device 704 may also comprise cache to facilitate processing operations.

Computer-executable instructions can be loaded in the memory 705 and, when executed by the processing device 704, cause the apparatus 700 to implement the above-described method 500. In particular, the computer-executable instructions can cause the apparatus 700 to: receive an uplink data block transmitted by a user equipment using grant free, wherein the uplink data block comprises information for identifying the user equipment identity; recognize the user equipment based on the information; and transmit a downlink channel to the user equipment after a predefined timing or in a predefined time window, wherein a part of the user equipment identity is used to scramble a predefined part of the user equipment specific downlink channel.

In an embodiment, the predefined part is the cyclic redundancy check of the downlink channel.

In an embodiment, the downlink channel is a downlink control channel, or a downlink data channel.

In an embodiment, the length of the user equipment identity is longer than the length of the cyclic redundancy check.

In an embodiment, the part of the user equipment identity is the least significant bits or the most significant bits of the user equipment identity.

In an embodiment, the user equipment identity comprises a first part used to identify the user equipment and a second part used to identify the network element serving the user equipment, and the first part is used to scramble a predefined part of the user equipment specific downlink channel.

In an embodiment, the downlink channel is a downlink control channel, which comprises an indicator indicating the function of the downlink control channel.

In an embodiment, the indicator contains one bit, and the function of the downlink control channel is for detection response or for scheduling a downlink data channel.

In an embodiment, the function of the downlink control channel is for detection response and the downlink control channel contains information of the rest part of the user equipment identity, or the function of the downlink control channel is for scheduling the downlink data channel and the scheduled downlink data channel contains information of the rest part of the user equipment identity.

In an embodiment, the downlink channel is a downlink data channel, which contains information of the rest of the user equipment identity.

In an embodiment, the user equipment specific downlink channel has fixed size.

In an embodiment, the user equipment's location is known to network within an area and the user equipment performs mobility within that area without notifying the network.

According to an aspect of the disclosure it is provided an apparatus such as network element for transmission in a wireless network. The network element comprises: means for receiving an uplink data block transmitted by a user equipment using grant free, wherein the uplink data block comprises information for identifying the user equipment identity; means for recognizing the user equipment based on the information; and means for transmitting a downlink channel to the user equipment after a predefined timing or in a predefined time window, wherein a part of the user equipment identity is used to scramble a predefined part of the user equipment specific downlink channel.

In an embodiment, the predefined part is the cyclic redundancy check of the downlink channel.

In an embodiment, the downlink channel is a downlink control channel, or a downlink data channel.

In an embodiment, the length of the user equipment identity is longer than the length of the cyclic redundancy check.

In an embodiment, the part of the user equipment identity is the least significant bits or the most significant bits of the user equipment identity.

In an embodiment, the user equipment identity comprises a first part used to identify the user equipment and a second part used to identify the network element serving the user equipment, and the first part is used to scramble a predefined part of the user equipment specific downlink channel.

In an embodiment, the downlink channel is a downlink control channel, which comprises an indicator indicating the function of the downlink control channel.

In an embodiment, the indicator contains one bit, and the function of the downlink control channel is for detection response or for scheduling a downlink data channel.

In an embodiment, the function of the downlink control channel is for detection response and the downlink control channel contains information of the rest part of the user equipment identity, or the function of the downlink control channel is for scheduling the downlink data channel and the scheduled downlink data channel contains information of the rest part of the user equipment identity.

In an embodiment, the downlink channel is a downlink data channel, which contains information of the rest of the user equipment identity.

In an embodiment, the user equipment specific downlink channel has fixed size.

In an embodiment, the user equipment's location is known to network within an area and the user equipment performs mobility within that area without notifying the network.

According to an aspect of the disclosure it is provided a computer program product comprising at least one non-transitory computer-readable storage medium having computer-executable program instructions stored therein, the computer-executable instructions being configured to, when being executed, cause a network element to operate as described above.

According to an aspect of the disclosure it is provided a computer program product comprising at least one non-transitory computer-readable storage medium having computer-executable program instructions stored therein, the computer-executable instructions being configured to, when being executed, cause a user equipment to operate as described above.

The embodiments of the disclosure can achieve the following advantages:

Lower decoding effort and therefore lower UE power consumption. Since UE does need to detect group PDCCH and PDSCH in each subframe of the response window. UE just detects the UE specific PDCCH after a fixed timing after a UL data transmission using grant-free.

Lower overhead. Since from base station point of view, it may transmit responding PDCCH only when it detects a UL data block, otherwise base station will not transmit any response. Besides, since base station will not allocate a C-RNTI to UE for transmitting a DL message carrying TCP ACK, the overhead is further reduced.

It is noted that any of the components of the network element and user equipment can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

The terms "computer program", "software" and "computer program code" are meant to include any sequences or human or machine cognizable steps which perform a function. Such program may be rendered in virtually any programming language or environment including, for example, C/C++, Fortran, COBOL, PASCAL, assembly language, markup languages (e.g., HTML, SGML, XML), and the like, as well as object-oriented environments such as the Common Object Request Broker Architecture (CORBA), Java™ (including J2ME, Java Beans, etc.), Binary Runtime Environment (BREW), and the like.

The terms "memory" and "storage device" are meant to include, but not limited to, an electronic, magnetic, optical, electromagnetic, infrared, or semiconductor system, apparatus, or device, or any suitable combination of the foregoing. More specific examples (a non-exhaustive list) of the memory or storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method comprising:
   transmitting an uplink data block using grant free transmission;
   detecting a downlink channel after a predefined timing or in a predefined time window; and
   determining whether the downlink channel is for a user equipment,
   wherein the uplink data block comprises information for identifying the user equipment identity, and a part of the user equipment identity is used to scramble a predefined part of the user equipment specific downlink channel, and
   wherein the part of the user equipment identity is least significant bits or most significant bits of the user equipment identity.

2. An apparatus comprising:
   at least one processor; and at least one memory including computer program code, wherein the at least one memory and the computer program code are configured to, with the at least one processor, cause the apparatus to
   transmit an uplink data block using grant free transmission; detect a downlink channel after a predefined timing or in a predefined time window; and
   determine whether the downlink channel is for a user equipment,
   wherein the uplink data block comprises information for identifying the user equipment identity, and a part of the user equipment identity is used to scramble a predefined part of the user equipment specific downlink channel, and wherein the part of the user equipment identity is least significant bits or most significant bits of the user equipment identity.

3. The apparatus according to claim 2, wherein the downlink channel is a downlink control channel or a downlink data channel.

4. The apparatus according to claim 2, wherein the predefined part is the cyclic redundancy check of the downlink channel.

5. The apparatus according to claim 2, wherein the length of the user equipment identity is longer than the length of the cyclic redundancy check.

6. The apparatus according to claim 2, wherein the user equipment identity comprises a first part used to identify the user equipment and a second part used to identify a network element serving the user equipment, and the first part is used to scramble a predefined part of the user equipment specific downlink channel.

7. The apparatus according to claim 2, wherein the downlink channel is a downlink control channel, and the at least one memory and the computer program code are further configured to, with the at least one processor, cause the apparatus to:
compare the part of the user equipment identity with the corresponding scrambling sequence used for the predefined part of the downlink control channel;
in response to the part of the user equipment identity matching the corresponding scrambling sequence, obtain the rest part of the user equipment identity in the downlink control channel, or in a scheduled downlink data channel; and
in response to the obtained user equipment identity combined by the part of the user equipment identity and the rest part of the user equipment identity matches the user equipment identity, determine the downlink control channel is for the user equipment.

8. The apparatus according to claim 2, wherein the downlink channel is a downlink data channel, and the rest of the user equipment identity is obtained from the downlink data channel.

9. The apparatus according to claim 2, wherein the downlink control channel comprises an indicator indicating the function of the downlink control channel.

10. The apparatus according to claim 9, wherein the indicator contains one bit, and the function of the downlink control channel is for detection response or for scheduling a downlink data channel.

11. The apparatus according to claim 10, wherein the function of the downlink control channel is for detection response and the rest part of the user equipment identity is obtained from the downlink control channel, or the function of the downlink control channel is for scheduling the downlink data channel and the rest part of the user equipment identity is obtained from the scheduled downlink data channel.

12. An apparatus comprising:
at least one processor; and
at least one memory including computer program code, wherein the at least one memory and the computer program code are configured to, with the at least one processor, cause the apparatus to
receive an uplink data block transmitted by a user equipment using grant free transmission,
wherein the uplink data block comprises information for identifying the user equipment identity;
recognize the user equipment based on the information; and
transmit a downlink channel to the user equipment after a predefined timing or in a predefined time window,
wherein a part of the user equipment identity is used to scramble a predefined part of the user equipment specific downlink channel, and
wherein the part of the user equipment identity is least significant bits or most significant bits of the user equipment identity.

13. The apparatus according to claim 12, wherein the predefined part is the cyclic redundancy check of the downlink channel.

14. The apparatus according to claim 12, wherein the user equipment identity comprises a first part used to identify the user equipment and a second part used to a network element serving the user equipment, and the first part is used to scramble a predefined part of the user equipment specific downlink channel.

15. The apparatus according to claim 12, wherein the downlink channel is a downlink data channel, which contains information of the rest of the user equipment identity.

16. The apparatus according to claim 12, wherein the downlink channel is a downlink control channel, which comprises an indicator indicating the function of the downlink control channel.

17. The apparatus according to claim 16, wherein the indicator contains one bit, and the function of the downlink control channel is for detection response or for scheduling a downlink data channel.

18. The apparatus according to claim 17, wherein the function of the downlink control channel is for detection response and the downlink control channel contains information of the rest part of the user equipment identity, or the function of the downlink control channel is for scheduling the downlink data channel and the scheduled downlink data channel contains information of the rest part of the user equipment identity.

* * * * *